United States Patent
Cheng et al.

(10) Patent No.: US 12,137,094 B2
(45) Date of Patent: Nov. 5, 2024

(54) METHOD AND APPARATUS FOR SECURE INTERACTION BETWEEN TERMINALS

(71) Applicant: Huawei Technologies Co., Ltd., Shenzhen (CN)

(72) Inventors: Ziyao Cheng, Shenzhen (CN); Shuiping Long, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 43 days.

(21) Appl. No.: 17/341,961

(22) Filed: Jun. 8, 2021

(65) Prior Publication Data

US 2021/0367942 A1    Nov. 25, 2021

Related U.S. Application Data

(63) Continuation of application No. 15/780,446, filed as application No. PCT/CN2015/096184 on Dec. 1, 2015, now Pat. No. 11,063,939.

(51) Int. Cl.
*H04L 29/06* (2006.01)
*H04L 9/40* (2022.01)
(Continued)

(52) U.S. Cl.
CPC .......... *H04L 63/0869* (2013.01); *H04W 4/80* (2018.02); *H04W 8/18* (2013.01); *H04W 8/205* (2013.01);
(Continued)

(58) Field of Classification Search
CPC .... H04L 63/0869; H04W 4/80; H04W 12/50; H04W 8/18; H04W 8/205; H04W 12/04; H04W 12/06; H04W 12/43; H04W 84/18
(Continued)

(56) References Cited

U.S. PATENT DOCUMENTS

2005/0114625 A1    5/2005 Snyder
2006/0085848 A1    4/2006 Aissi et al.
(Continued)

FOREIGN PATENT DOCUMENTS

CN    101031939 A    9/2007
CN    101720071 A    6/2010
(Continued)

OTHER PUBLICATIONS

Subashini, "A survey on security issues in service delivery models of cloud computing", Jul. 11, 2010, Journal of Network and Computer Applications, pp. 1-11 (Year: 2010).*
(Continued)

*Primary Examiner* — Taghit T Arani
*Assistant Examiner* — Gregory A Lane
(74) *Attorney, Agent, or Firm* — Conley Rose, P.C.

(57) ABSTRACT

A method and an apparatus for secure interaction between terminals, where the method includes indicating or indirectly indicating, by a companion terminal with an embedded Universal Integrated Circuit Card (eUICC), a Hypertext Transfer Protocol (HTTP) over Secure Socket Layer (HTTPS) Uniform Resource Locator (URL) including security information to a primary terminal such that the primary terminal initiates establishment of a local Transport Layer Security (TLS) connection according to the HTTPS URL, receiving, by the companion terminal, an HTTP request from the primary terminal using the local TLS connection, completing establishment of an HTTPS session when the companion terminal determines that the HTTP request includes the security information, and receiving, by the companion terminal, an operation instruction for the eUICC from the primary terminal using the HTTPS session.

22 Claims, 7 Drawing Sheets

(51) Int. Cl.
*H04W 4/80* (2018.01)
*H04W 8/18* (2009.01)
*H04W 8/20* (2009.01)
*H04W 12/04* (2021.01)
*H04W 12/06* (2021.01)
*H04W 12/50* (2021.01)
*H04W 12/43* (2021.01)
*H04W 84/18* (2009.01)

(52) U.S. Cl.
CPC .......... *H04W 12/04* (2013.01); *H04W 12/06* (2013.01); *H04W 12/50* (2021.01); *H04W 12/43* (2021.01); *H04W 84/18* (2013.01)

(58) Field of Classification Search
USPC .......................................................... 726/6
See application file for complete search history.

(56) References Cited

U.S. PATENT DOCUMENTS

| | | | |
|---|---|---|---|
| 2006/0242148 A1* | 10/2006 | Rothpearl | G16H 40/67 |
| 2008/0109656 A1 | 5/2008 | Kotzin | |
| 2009/0133014 A1 | 5/2009 | Laurila et al. | |
| 2010/0268846 A1* | 10/2010 | Gann | H04N 21/8153 |
| | | | 709/246 |
| 2011/0258687 A1* | 10/2011 | White | G06F 21/606 |
| | | | 726/6 |
| 2014/0228071 A1 | 8/2014 | Villarrubia Grande et al. | |
| 2014/0310185 A1 | 10/2014 | Staflin | |
| 2015/0143125 A1* | 5/2015 | Nix | H04L 12/2854 |
| | | | 713/171 |
| 2015/0180847 A1* | 6/2015 | Nix | H04W 12/35 |
| | | | 713/168 |
| 2015/0249902 A1 | 9/2015 | Gemeto et al. | |
| 2015/0347786 A1 | 12/2015 | Yang et al. | |
| 2016/0142906 A1 | 5/2016 | Park et al. | |
| 2016/0150400 A1 | 5/2016 | Cha et al. | |
| 2016/0192406 A1* | 6/2016 | De Schepper | H04L 67/104 |
| | | | 370/329 |
| 2018/0041601 A1* | 2/2018 | Park | H04L 9/3271 |
| 2019/0087814 A1 | 3/2019 | Lassouaoui et al. | |

FOREIGN PATENT DOCUMENTS

| | | |
|---|---|---|
| CN | 101861567 A | 10/2010 |
| CN | 103765934 A | 4/2014 |
| EP | 2747368 A1 | 6/2014 |
| GB | 2456499 A | 7/2009 |
| GB | 2522044 A | 7/2015 |
| WO | 2015020629 A1 | 2/2015 |
| WO | 2015085571 A1 | 6/2015 |

OTHER PUBLICATIONS

Park, "Secure Profile Provisioning Architecture for Embedded UICC", 2013, IEEE, pp. 297-303 (Year: 2013).*

Sethi, "Secure and Low-Power Authentication for Resource-Constrained Device", 2015, IEEE, pp. 1-8.

GSM Association, "Remote Provisioning Architecture for Embedded UICC Technical Specification," Non-confidential Official Document 12FAST.15, Version 1.0, Dec. 17, 2013, 294 pages.

Dierks, T. et al., "The TLS Protocol Version 1.0", RFC 2246, Jan. 1999, 65 pages.

Eronen, P., Ed., at al., "Pre-Shared Key Ciphersuites for Transport Layer Security (TLS)", RFC 4279, Dec. 2005, 13 pages.

Park, J., et al., "Secure Profile Provisioning Architecture for Embedded UICC," XP032524210, International Conference on Availability, Reliability and Security, Sep. 2013, pp. 297-303.

* cited by examiner

METHOD AND APPARATUS FOR SECURE
INTERACTION BETWEEN TERMINALS

CROSS-REFERENCE TO RELATED APPLICATIONS

This application is a continuation of U.S. patent application Ser. No. 15/780,446, filed on May 31, 2018, which is a National Stage of International Patent Application No. PCT/CN2015/096184 filed on Dec. 1, 2015. Both of the aforementioned applications are hereby incorporated by reference in their entireties.

TECHNICAL FIELD

The present disclosure relates to the field of communications technologies, and in particular, to a method and an apparatus for secure interaction between terminals.

BACKGROUND

An embedded Universal Integrated Circuit Card (eUICC) is a third-generation telecommunications smart card, and can support remote configuration and management of operator data. The eUICC is usually integrated in a terminal. However, some terminals are limited by capacities of the terminals, and consequently cannot directly perform an operation such as downloading or activation of a configuration file (profile) in the eUICC. For example, an eUICC-integrated terminal (hereinafter referred to as a companion terminal) whose user interface (UI) is limited and that initially has no cellular network access capability needs to access a network with the help of a primary terminal, and the primary terminal provides a UI to complete operations such as downloading and activation of the profile.

To ensure security of the profile in the companion terminal and avoid risks such as deletion, forgery, and modification that are performed, by an unauthorized terminal, on the profile in the companion terminal, before the primary terminal performs an operation on the profile in the companion terminal, a solution for secure interaction between the primary terminal and the companion terminal needs to be developed. Currently, there is still no solution for secure interaction between the primary terminal and the companion terminal.

SUMMARY

Embodiments of the present disclosure provide a method and an apparatus for secure interaction between terminals in order to provide a solution for secure interaction between a primary terminal and a companion terminal.

An embodiment of the present disclosure provides a method for secure interaction between terminals, and the method includes indicating or indirectly indicating, by a companion terminal with an eUICC, a Hypertext Transfer Protocol (HTTP) over Secure Socket Layer (HTTPS) Uniform Resource Locator (URL) including security information to a primary terminal such that the primary terminal establishes a local Transport Layer Security (TLS) connection to the companion terminal based on a certificate authentication manner according to the HTTPS URL, receiving, by the companion terminal, an HTTP request that is sent by the primary terminal using the local TLS connection, and if the companion terminal determines that the HTTP request includes the security information, returning an HTTP response to the primary terminal in order to complete establishment of an HTTPS session, and receiving, by the companion terminal, an operation instruction for the eUICC that is sent by the primary terminal using the HTTPS session.

Optionally, indicating or indirectly indicating, by a companion terminal, an HTTPS URL including security information to a primary terminal includes transferring, by the companion terminal, the HTTPS URL including the security information to the primary terminal, directly displaying, by the companion terminal, the HTTPS URL including the security information in order to indirectly indicate the HTTPS URL to the primary terminal, or displaying, by the companion terminal, a graph of the HTTPS URL including the security information in order to indirectly indicate the HTTPS URL to the primary terminal.

An embodiment of the present disclosure provides a method for secure interaction between terminals, and the method includes obtaining, by a primary terminal, an HTTPS URL that includes security information and that is indicated or indirectly indicated by a companion terminal with an eUICC, establishing, by the primary terminal, a local TLS connection to the companion terminal based on a certificate authentication manner according to the HTTPS URL, sending an HTTP request including the security information to the companion terminal using the local TLS connection, and completing establishment of an HTTPS session after receiving an HTTP response returned by the companion terminal, and sending, by the primary terminal, an operation instruction for the eUICC to the companion terminal using the HTTPS session.

An embodiment of the present disclosure provides a method for secure interaction between terminals, and the method includes indicating or indirectly indicating, by a companion terminal with an eUICC, an HTTP URL including first security information to a primary terminal, if the companion terminal receives an HTTP request that is sent by the primary terminal using a first HTTPS URL including the first security information, returning the HTTPS URL to the primary terminal such that the primary terminal initiates establishment of an HTTPS session according to the HTTPS URL, and receiving, by the companion terminal using the HTTPS session, an operation instruction for the eUICC that is sent by the primary terminal.

Optionally, indicating or indirectly indicating, by a companion terminal, an HTTP URL including first security information to a primary terminal includes transferring, by the companion terminal, the HTTP URL including the first security information to the primary terminal, or directly displaying, by the companion terminal, the HTTP URL including the first security information in order to indirectly indicate the HTTP URL to the primary terminal, or displaying, by the companion terminal, a graph of the HTTP URL including the first security information in order to indirectly indicate the HTTP URL to the primary terminal.

Optionally, after the companion terminal receives an HTTP request that is sent by the primary terminal using a first HTTP URL including the first security information, the method further includes returning, by the companion terminal and to the primary terminal, a second HTTP URL used for downloading a certification authority (CA) root certificate, where the CA root certificate is used by the primary terminal to establish a local TLS connection to the companion terminal based on a certificate authentication manner.

Optionally, after returning, by the companion terminal, the HTTPS URL to the primary terminal, the method further includes receiving, by the companion terminal, a Transmission Control Protocol (TCP) connection request that is sent by the primary terminal according to the HTTPS URL, and responding to the TCP connection request in order to complete TCP connection establishment if the companion terminal determines that a source Internet Protocol (IP) address of the TCP connection request is the same as a source IP address of the HTTP request.

Optionally, the HTTPS URL includes second security information, and before receiving, by the companion terminal using the HTTPS session, an operation instruction for the eUICC that is sent by the primary terminal, the method further includes completing establishment of the HTTPS session if the companion terminal determines that the second security information sent by the primary terminal is received.

An embodiment of the present disclosure provides a method for secure interaction between terminals, and the method includes obtaining, by a primary terminal, a first HTTP URL that includes first security information and that is indicated or indirectly indicated by a companion terminal with an eUICC, sending, by the primary terminal, an HTTP request including the first HTTP URL to the companion terminal, where the first HTTP URL includes the first security information, receiving, by the primary terminal, an HTTPS URL that is sent by the companion terminal to the primary terminal according to the HTTP request, initiating establishment of an HTTPS session according to the HTTPS URL, and sending, by the primary terminal, an operation instruction for the eUICC to the companion terminal using the HTTPS session.

Optionally, obtaining, by a primary terminal, a first HTTP URL that includes first security information and that is indicated or indirectly indicated by a companion terminal with an eUICC includes receiving, by the primary terminal, the HTTP URL that includes the first security information and that is transferred by the companion terminal, obtaining, by the companion terminal, the HTTP URL using the HTTP URL that includes the first security information and that is directly displayed by the companion terminal, or obtaining, by the companion terminal, the HTTP URL by scanning a graph of the HTTP URL including the first security information.

Optionally, after sending, by the primary terminal, an HTTP request including the first HTTP URL to the companion terminal, the method further includes receiving, by the primary terminal, a second HTTP URL that is used for downloading a CA root certificate and that is sent by the companion terminal, and establishing a local TLS connection to the companion terminal according to the CA root certificate based on a certificate authentication manner.

Optionally, after receiving, by the primary terminal, an HTTPS URL that is sent by the companion terminal to the primary terminal according to the HTTP request including the first security information, the method further includes sending, by the primary terminal, a TCP connection request to the companion terminal according to the HTTPS URL such that the companion terminal responds to the TCP connection request according to a source IP address of the TCP connection request and a source IP address of the HTTP request.

Optionally, the HTTPS URL includes second security information, and before sending, by the primary terminal, an operation instruction for the eUICC to the companion terminal using the HTTPS session, the method further includes sending, by the primary terminal, the second security information to the companion terminal such that the companion terminal completes establishment of the HTTPS session after receiving the second security information.

An embodiment of the present disclosure provides a method for secure interaction between terminals, and the method includes indicating or indirectly indicating, by a companion terminal with an eUICC, address information and security information of the companion terminal to a primary terminal such that the primary terminal establishes a local security application session according to the address information and the security information, and receiving, by the companion terminal using the local security application session, an operation instruction for the eUICC that is sent by the primary terminal.

Optionally, indicating or indirectly indicating, by a companion terminal, address information and security information of the companion terminal to a primary terminal includes transferring, by the companion terminal, the address information and the security information to the primary terminal, directly displaying, by the companion terminal, the address information and the security information in order to indirectly indicate the address information and the security information to the primary terminal, or displaying, by the companion terminal, a graph including the address information and the security information in order to indirectly indicate the address information and the security information to the primary terminal.

Optionally, the security information is used as a pre-shared key such that the companion terminal and the primary terminal perform mutual authentication using the pre-shared key and establish a local security application session.

Optionally, after indicating or indirectly indicating, by a companion terminal with an eUICC, address information and security information of the companion terminal to a primary terminal, the method further includes receiving, by the companion terminal, a local security application session request of the primary terminal, and using obtained key information of a local connection as a pre-shared key, and after the companion terminal and the primary terminal perform mutual authentication using the pre-shared key, if security information sent by the primary terminal is received, completing establishment of the local security application session.

An embodiment of the present disclosure provides a method for secure interaction between terminals, and the method includes obtaining, by a primary terminal, address information and security information that are indicated or indirectly indicated by a companion terminal with an eUICC to the primary terminal, establishing, by the primary terminal, a local security application session according to the address information and the security information, and sending, by the primary terminal, an operation instruction for the eUICC to the companion terminal using the local security application session.

Optionally, obtaining, by a primary terminal, address information and security information that are indicated or indirectly indicated by a companion terminal with an eUICC to the primary terminal includes receiving, by the primary terminal, the address information and the security information that are transferred by the companion terminal, obtaining, by the companion terminal, the address information and the security information using the address information and the security information that are directly displayed by the companion terminal, or obtaining, by the companion terminal, the address information and the security information by scanning a graph including the address information and the security information.

Optionally, the security information is used as a pre-shared key such that the primary terminal and the companion terminal perform mutual authentication according to the pre-shared key and establish a local security application session.

Optionally, establishing, by the primary terminal, a local security application session according to the address information and the security information includes sending, by the primary terminal, a local security application session request to the companion terminal, and using obtained key information of a local connection as a pre-shared key, and after the primary terminal and the companion terminal perform mutual authentication using the pre-shared key, sending the security information to the companion terminal such that the companion terminal completes establishment of the local security application session after determining that the security information sent by the primary terminal is received.

An embodiment of the present disclosure provides an apparatus for secure interaction between terminals, and the apparatus includes a processor configured to indicate or indirectly indicate an HTTPS URL including security information to a primary terminal such that the primary terminal establishes a local TLS connection to the companion terminal based on a certificate authentication manner according to the HTTPS URL, and a transceiver configured to receive an HTTP request that is sent by the primary terminal using the local TLS connection, and if the companion terminal determines that the HTTP request includes the security information, return an HTTP response to the primary terminal in order to complete establishment of an HTTPS session, and receive an operation instruction for the eUICC that is sent by the primary terminal using the HTTPS session.

Optionally, the processor is further configured to transfer the HTTPS URL including the security information to the primary terminal, directly display the HTTPS URL including the security information in order to indirectly indicate the HTTPS URL to the primary terminal, or display a graph of the HTTPS URL including the security information in order to indirectly indicate the HTTPS URL to the primary terminal.

An embodiment of the present disclosure provides an apparatus for secure interaction between terminals, and the apparatus includes a processor configured to obtain an HTTPS URL that includes security information and that is indicated or indirectly indicated by a companion terminal with an eUICC, and establish a local TLS connection to the companion terminal based on a certificate authentication manner according to the HTTPS URL, send an HTTP request including the security information to the companion terminal using the local TLS connection, and complete establishment of an HTTPS session after receiving an HTTP response returned by the companion terminal, and a transceiver configured to send an operation instruction for the eUICC to the companion terminal using the HTTPS session.

An embodiment of the present disclosure provides an apparatus for secure interaction between terminals, and the apparatus includes a processor configured to indicate or indirectly indicate an HTTP URL including first security information to a primary terminal, and a transceiver configured to return the HTTPS URL to the primary terminal such that the primary terminal initiates establishment of an HTTPS session according to the HTTPS URL if an HTTP request that is sent by the primary terminal using a first HTTPS URL including the first security information is received, and receive, using the HTTPS session, an operation instruction for the eUICC that is sent by the primary terminal.

Optionally, the processor is further configured to transfer the HTTP URL including the first security information to the primary terminal, directly display the HTTP URL including the first security information in order to indirectly indicate the HTTP URL to the primary terminal, or display a graph of the HTTP URL including the first security information in order to indirectly indicate the HTTP URL to the primary terminal.

Optionally, the transceiver is further configured to return, to the primary terminal, a second HTTP URL used for downloading a CA root certificate, where the CA root certificate is used by the primary terminal to establish a local TLS connection to the companion terminal based on a certificate authentication manner.

Optionally, the transceiver is further configured to receive a TCP connection request that is sent by the primary terminal according to the HTTPS URL, and if a source IP address of the TCP connection request is the same as a source IP address of the HTTP request, respond to the TCP connection request in order to complete TCP connection establishment.

Optionally, the HTTPS URL includes second security information, and the transceiver is configured to if the second security information sent by the primary terminal is received, complete establishment of the HTTPS session.

An embodiment of the present disclosure provides an apparatus for secure interaction between terminals, and the apparatus includes a processor configured to obtain a first HTTP URL that includes first security information and that is indicated or indirectly indicated by a companion terminal with an eUICC, and a transceiver configured to send an HTTP request including the first HTTP URL to the companion terminal, where the first HTTP URL includes the first security information, and receive an HTTPS URL that is sent by the companion terminal to the primary terminal according to the HTTP request, and initiate establishment of an HTTPS session according to the HTTPS URL, and send an operation instruction for the eUICC to the companion terminal using the HTTPS session.

Optionally, the processor is further configured to receive the HTTP URL that includes the first security information and that is transferred by the companion terminal, obtain the HTTP URL using the HTTP URL that includes the first security information and that is directly displayed by the companion terminal, or obtain the HTTP URL by scanning a graph of the HTTP URL including the first security information.

Optionally, the transceiver is further configured to receive a second HTTP URL that is used for downloading a CA root certificate and that is sent by the companion terminal, and establish a local TLS connection to the companion terminal according to the CA root certificate based on a certificate authentication manner.

Optionally, after the primary terminal receives the HTTPS URL that is sent by the companion terminal to the primary terminal according to the HTTP request including the first security information, the transceiver is further configured to send a TCP connection request to the companion terminal according to the HTTPS URL such that the companion terminal responds to the TCP connection request according to a source IP address of the TCP connection request and a source IP address of the HTTP request.

Optionally, the HTTPS URL includes second security information, and the transceiver is configured to send the second security information to the companion terminal such that the companion terminal completes establishment of the HTTPS session after receiving the second security information.

An embodiment of the present disclosure provides an apparatus for secure interaction between terminals, and the apparatus includes a processor configured to indicate or indirectly indicate address information and security information of a companion terminal to a primary terminal such that the primary terminal establishes a local security application session according to the address information and the security information, and a transceiver configured to receive, using the local security application session, an operation instruction for the eUICC that is sent by the primary terminal.

Optionally, the processor is further configured to transfer the address information and the security information to the primary terminal, directly display the address information and the security information in order to indirectly indicate the address information and the security information to the primary terminal, or display a graph including the address information and the security information in order to indirectly indicate the address information and the security information to the primary terminal.

Optionally, the security information is used as a pre-shared key such that the companion terminal and the primary terminal perform mutual authentication using the pre-shared key and establish a local security application session.

Optionally, the transceiver is further configured to receive a local security application session request of the primary terminal, and use obtained key information of a local connection as a pre-shared key, and after the companion terminal and the primary terminal perform mutual authentication using the pre-shared key, if security information sent by the primary terminal is received, complete establishment of the local security application session.

An embodiment of the present disclosure provides an apparatus for secure interaction between terminals, and the apparatus includes a processor configured to obtain address information and security information that are indicated or indirectly indicated by a companion terminal with an eUICC to a primary terminal, and establish a local security application session according to the address information and the security information, and a transceiver configured to send an operation instruction for the eUICC to the companion terminal using the local security application session.

Optionally, the processor is further configured to receive the address information and the security information that are transferred by the companion terminal, obtain the address information and the security information using the address information and the security information that are directly displayed by the companion terminal, or obtain the address information and the security information by scanning a graph including the address information and the security information.

Optionally, the security information is used as a pre-shared key such that the primary terminal and the companion terminal perform mutual authentication according to the pre-shared key and establish a local security application session.

Optionally, the processor is further configured to send a local security application session request to the companion terminal, and use obtained key information of a local connection as a pre-shared key, and after the primary terminal and the companion terminal perform mutual authentication using the pre-shared key, send the security information to the companion terminal such that the companion terminal completes establishment of the local security application session after determining that the security information sent by the primary terminal is received.

An embodiment of the present disclosure provides an apparatus for secure interaction between terminals, and the apparatus includes a processing unit configured to indicate or indirectly indicate an HTTPS URL including security information to a primary terminal such that the primary terminal establishes a local TLS connection to the companion terminal based on a certificate authentication manner according to the HTTPS URL, and a transceiver unit configured to receive an HTTP request that is sent by the primary terminal using the local TLS connection, and if the companion terminal determines that the HTTP request includes the security information, return an HTTP response to the primary terminal in order to complete establishment of an HTTPS session, and receive an operation instruction for the eUICC that is sent by the primary terminal using the HTTPS session.

Optionally, the processing unit is further configured to transfer the HTTPS URL including the security information to the primary terminal, directly display the HTTPS URL including the security information in order to indirectly indicate the HTTPS URL to the primary terminal, or display a graph of the HTTPS URL including the security information in order to indirectly indicate the HTTPS URL to the primary terminal.

An embodiment of the present disclosure provides an apparatus for secure interaction between terminals, and the apparatus includes a processing unit configured to obtain an HTTPS URL that includes security information and that is indicated or indirectly indicated by a companion terminal with an eUICC, and establish a local TLS connection to the companion terminal based on a certificate authentication manner according to the HTTPS URL, send an HTTP request including the security information to the companion terminal using the local TLS connection, and complete establishment of an HTTPS session after receiving an HTTP response returned by the companion terminal, and a transceiver unit configured to send an operation instruction for the eUICC to the companion terminal using the HTTPS session.

An embodiment of the present disclosure provides an apparatus for secure interaction between terminals, and the apparatus includes a processing unit configured to indicate or indirectly indicate an HTTP URL including first security information to a primary terminal, and a transceiver unit configured to if an HTTP request that is sent by the primary terminal using a first HTTPS URL including the first security information is received, return the HTTPS URL to the primary terminal such that the primary terminal initiates establishment of an HTTPS session according to the HTTPS URL, and receive, using the HTTPS session, an operation instruction for the eUICC that is sent by the primary terminal.

Optionally, the processing unit is further configured to transfer the HTTP URL including the first security information to the primary terminal, directly display the HTTP URL including the first security information in order to indirectly indicate the HTTP URL to the primary terminal, or display a graph of the HTTP URL including first security information in order to indirectly indicate the HTTP URL to the primary terminal.

Optionally, the transceiver unit is further configured to return, to the primary terminal, a second HTTP URL used for downloading a CA root certificate, where the CA root certificate is used by the primary terminal to establish a local TLS connection to the companion terminal based on a certificate authentication manner.

Optionally, the transceiver unit is further configured to receive a TCP connection request that is sent by the primary terminal according to the HTTPS URL, and if a source IP address of the TCP connection request is the same as a source IP address of the HTTP request, respond to the TCP connection request in order to complete TCP connection establishment.

Optionally, the HTTPS URL includes second security information, and the transceiver unit is configured to complete establishment of the HTTPS session if the second security information sent by the primary terminal is received.

An embodiment of the present disclosure provides an apparatus for secure interaction between terminals, and the apparatus includes a processing unit configured to obtain a first HTTP URL that includes first security information and that is indicated or indirectly indicated by a companion terminal with an eUICC, and a transceiver unit configured to send an HTTP request including the first HTTP URL to the companion terminal, where the first HTTP URL includes the first security information, and receive an HTTPS URL that is sent by the companion terminal to the primary terminal according to the HTTP request, and initiate establishment of an HTTPS session according to the HTTPS URL, and send an operation instruction for the eUICC to the companion terminal using the HTTPS session.

Optionally, the processing unit is further configured to receive the HTTP URL that includes the first security information and that is transferred by the companion terminal, obtain the HTTP URL using the HTTP URL that includes the first security information and that is directly displayed by the companion terminal, or obtain the HTTP URL by scanning a graph of the HTTP URL including the first security information.

Optionally, the transceiver unit is further configured to receive a second HTTP URL that is used for downloading a CA root certificate and that is sent by the companion terminal, and establish a local TLS connection to the companion terminal according to the CA root certificate based on a certificate authentication manner.

Optionally, after the primary terminal receives the HTTPS URL that is sent by the companion terminal to the primary terminal according to the HTTP request including the first security information, the transceiver unit is further configured to send a TCP connection request to the companion terminal according to the HTTPS URL such that the companion terminal responds to the TCP connection request according to a source IP address of the TCP connection request and a source IP address of the HTTP request.

Optionally, the HTTPS URL includes second security information, and the transceiver unit is configured to send the second security information to the companion terminal such that the companion terminal completes establishment of the HTTPS session after receiving the second security information.

An embodiment of the present disclosure provides an apparatus for secure interaction between terminals, and the apparatus includes a processing unit configured to indicate or indirectly indicate address information and security information of a companion terminal to a primary terminal such that the primary terminal establishes a local security application session according to the address information and the security information, and a transceiver unit configured to receive, using the local security application session, an operation instruction for the eUICC that is sent by the primary terminal.

Optionally, the processing unit is further configured to transfer the address information and the security information to the primary terminal, directly display the address information and the security information in order to indirectly indicate the address information and the security information to the primary terminal, or display a graph including the address information and the security information in order to indirectly indicate the address information and the security information to the primary terminal.

Optionally, the security information is used as a pre-shared key such that the companion terminal and the primary terminal perform mutual authentication using the pre-shared key and establish a local security application session.

Optionally, the transceiver unit is further configured to receive a local security application session request of the primary terminal, and use obtained key information of a local connection as a pre-shared key, and after the companion terminal and the primary terminal perform mutual authentication using the pre-shared key, if security information sent by the primary terminal is received, complete establishment of the local security application session.

An embodiment of the present disclosure provides an apparatus for secure interaction between terminals, and the apparatus includes a processing unit configured to obtain address information and security information that are indicated or indirectly indicated by a companion terminal with an eUICC to a primary terminal, and establish a local security application session according to the address information and the security information, and a transceiver unit configured to send an operation instruction for the eUICC to the companion terminal using the local security application session.

Optionally, the processing unit is further configured to receive the address information and the security information that are transferred by the companion terminal, obtain the address information and the security information using the address information and the security information that are directly displayed by the companion terminal, or obtain the address information and the security information by scanning a graph including the address information and the security information.

Optionally, the security information is used as a pre-shared key such that the primary terminal and the companion terminal perform mutual authentication using the pre-shared key and establish a local security application session.

Optionally, the processing unit is further configured to send a local security application session request to the companion terminal, and use obtained key information of a local connection as a pre-shared key, and after the primary terminal and the companion terminal perform mutual authentication using the pre-shared key, send the security information to the companion terminal such that the companion terminal completes establishment of the local security application session after determining that the security information sent by the primary terminal is received.

According to the method and the apparatus that are provided in the embodiments of the present disclosure, a companion terminal with an eUICC performs permission authentication on a primary terminal using security information, and the primary terminal performs identity authentication on the companion terminal using a root certificate of the companion terminal, and then an operation instruction for the eUICC is sent and received between the primary terminal and the companion terminal using an HTTPS session, thereby improving confidentiality and integrity of an operation command in a transmission process.

DESCRIPTION OF EMBODIMENTS

Figure 1:
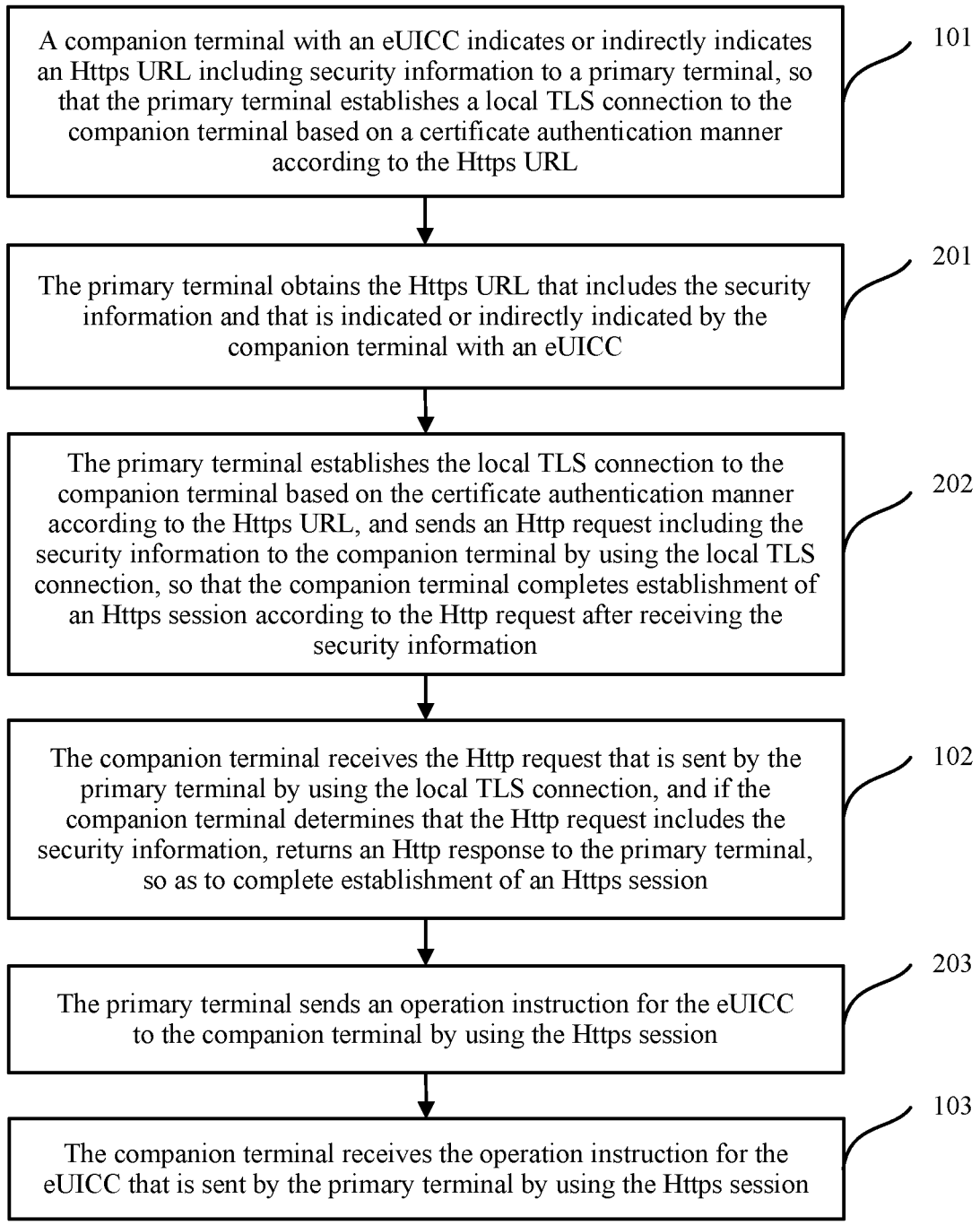
FIG. 1 is a schematic flowchart of a method for secure interaction between terminals according to an embodiment of the present disclosure.

The following describes embodiments of the present disclosure in detail with reference to accompanying drawings for this specification.

In the embodiments of the present disclosure, a companion terminal may be a mobile phone, a wearable terminal, a computer, a tablet computer, a personal digital assistant (PDA), a mobile Internet terminal (MID), an IP phone, a network printer, an electronic book (e-book) reader, or the like.

Correspondingly, a primary terminal may be a mobile terminal, a wearable terminal, a computer, a tablet computer, a personal digital assistant, a mobile Internet terminal, an IP phone, a network printer, an e-book reader, or the like.

An eUICC is integrated in the companion terminal, and a local profile assistant (LPA) in the companion terminal downloads and manages a profile in the eUICC. The profile may refer to a combination of a file structure, data, and an application.

In the embodiments of the present disclosure, the LPA of the companion terminal may have a Web Server enhancement capability such that a service for browsing information on the Internet can be provided. In addition, both the companion terminal and the primary terminal support one or more of the following protocols of HTTP, a TLS protocol, TCP/IP, and an HTTPS.

In addition, in the embodiments of the present disclosure, both the companion terminal and the primary terminal may further support some non-IP protocols.

In an existing eUICC system architecture, subscription manager data preparation (SM-DP) is responsible for generating a profile, downloading the profile, and installing the profile on the eUICC. The SM-DP may also be referred to as a profile installer (or installer). Subscription manager secure routine (SM-SR) is responsible for managing the profile on the eUICC, and ensures security of communication between the eUICC and a remote entity. The SM-SR may also be referred to as a profile manager (or manager). Subscription manager discovery service (SM-DS) enables the eUICC and a terminal to detect whether there is a to-be-downloaded profile. A mobile network operator (MNO) needs to request a service from the SM-SR and the SM-DP, for example, ordering a profile from the SM-DP, and requesting the SM-SR to manage the profile on the eUICC (for example, setting a state of the profile, and deleting the profile).

In the embodiments of the present disclosure, the companion terminal may be connected to the primary terminal in a BLUETOOTH manner, or may be connected to the primary terminal in a WI-FI manner.

For example, the primary terminal enables a WI-FI network sharing hotspot. After detecting the WI-FI network sharing hotspot enabled by the primary terminal, the companion terminal may access the WI-FI network sharing hotspot enabled by the primary terminal using a service set identifier (SSID) of the WI-FI network sharing hotspot and a WI-FI key. After the companion terminal accesses the network sharing hotspot of the primary terminal, the primary terminal may be used as a Dynamic Host Configuration Protocol (DHCP) server to configure an IP address for the companion terminal such that the companion terminal and the primary terminal may communicate using a local connection (WI-FI).

For example, the primary terminal enables a BLUETOOTH network sharing hotspot. After detecting the BLUETOOTH network sharing hotspot enabled by the primary terminal, the companion terminal accesses, using a personal identification number (PIN), the BLUETOOTH network sharing hotspot enabled by the primary terminal such that the companion terminal and the primary terminal may communicate using a local connection (BLUETOOTH).

In the embodiments of the present disclosure, the companion terminal first initializes the eUICC, for example, powering on, providing a clock signal, receiving answer to reset (ATR) information, and performing a prepaid service (PPS) procedure.

Based on the foregoing description, FIG. 1 shows a schematic flowchart of a method for secure interaction between terminals according to an embodiment of the present disclosure.

As shown in FIG. 1, the method includes the following steps.

Step 101: A companion terminal with an eUICC indicates or indirectly indicates an HTTPS URL including security information to a primary terminal such that the primary terminal establishes a local TLS connection to the companion terminal based on a certificate authentication manner according to the HTTPS URL.

In step 101, the security information may be a token generated by the companion terminal. The token may be a random number generated by the companion terminal.

Alternatively, the security information may be information such as a random number generated by the companion terminal, and this is not limited in the present disclosure.

The HTTPS URL generated by the companion terminal may include a used protocol name, address information of the companion terminal, and security information. The address information of the companion terminal may be an IP address.

For example, an LPA of the companion terminal may obtain, using an operating system (OS) of the companion terminal, an IP address that is allocated by the primary terminal to the companion terminal, and generates a token as security information. A transfer protocol specified by the companion terminal may be the HTTPS protocol. In this case, the generated HTTPS URL may be https://192.168.0.x/LPA? eUICC_access token=xxxxxx. The address information of the companion terminal is 192.168.0.x, and a name of the security information is eUICC_access token.

The companion terminal may directly indicate the HTTPS URL including the security information to the primary terminal, or may indirectly indicate the HTTPS URL including the security information to the primary terminal.

When the companion terminal directly indicates the HTTPS URL including the security information to the primary terminal, the companion terminal may directly indicate the HTTPS URL to the primary terminal.

For example, the companion terminal may transfer the HTTPS URL to the primary terminal in a Near Field Communication (NFC) manner.

Alternatively, the companion terminal may display a graph after converting the HTTPS URL into the graph in order to indicate the HTTPS URL to the primary terminal. For example, the companion terminal may display a quick response code on a display unit of the companion terminal after converting the HTTPS URL into the quick response code such that the primary terminal scans the quick response code displayed by the companion terminal in order to instruct the primary terminal to obtain the HTTPS URL. Certainly, alternatively, the companion terminal may send the HTTPS URL to the primary terminal after converting the HTTPS URL into a graph.

Alternatively, the companion terminal may indirectly indicate the HTTPS URL including the security information to the primary terminal. The companion terminal directly displays the HTTPS URL, and a user may input the displayed HTTPS URL to the primary terminal. Certainly, alternatively, the primary terminal may scan the HTTPS URL displayed by the companion terminal, and identify, using a character recognition algorithm, the HTTPS URL obtained by means of scanning.

Correspondingly, step 201: The primary terminal obtains the HTTPS URL that includes security information and that is indicated or indirectly indicated by the companion terminal with an eUICC.

In step 201, with reference to the description of step 101, the primary terminal may obtain the HTTPS URL in the NFC manner. The primary terminal may also obtain the HTTPS URL by scanning a graph into which the HTTPS URL is converted. For another manner in which the primary terminal obtains the HTTPS URL, refer to the foregoing description, and details are not described herein again.

Step 202: The primary terminal establishes the local TLS connection to the companion terminal based on the certificate authentication manner according to the HTTPS URL, and sends an HTTP request including the security information to the companion terminal using the local TLS connection such that the companion terminal completes establishment of an HTTPS session according to the HTTP request after receiving the security information.

In step 202, after the primary terminal obtains the HTTPS URL, the HTTPS session between the primary terminal and the companion terminal may be established according to the HTTPS URL such that an operation instruction for the eUICC in the companion terminal is sent to the companion terminal using the established HTTPS session.

It should be noted that, in this embodiment of the present disclosure, the primary terminal may include a browser with a preset root certificate or an application with a preset root certificate such that the primary terminal may establish the local TLS connection to the companion terminal according to the browser with a preset root certificate or the application with a preset root certificate based on the certificate authentication manner according to the HTTPS URL.

Establishment of an HTTPS session generally includes three steps. In a first step, a TCP connection is established. The TCP connection is used to establish a transmission connection between the primary terminal and the companion terminal, and this step is a step prior to establishment of a TLS connection. In a second step, the local TLS connection is established. Encryption and integrity protection for HTTP transmission data are implemented using the TLS connection. In a third step, an HTTP request is sent, and an HTTP response is received. After establishment of the TLS connection is completed, the primary terminal sends an HTTP request to the companion terminal using the local TLS connection, after receiving the HTTP request, the companion terminal returns an HTTP response to the primary terminal, and establishment of an HTTPS session is completed after the primary terminal receives the HTTP response.

In the first step, the primary terminal initiates, using address information of the companion terminal in the HTTPS URL, the TCP connection used for establishing an HTTPS session.

For example, the HTTPS URL is https://192.168.0.x/LPA? eUICC_access token=xx. The primary terminal initiates the TCP connection to the companion terminal according to the address information 192.168.0.x.

In the second step, after establishment of the TCP connection is completed, the primary terminal initiates a process of establishing a local TLS connection. In the process of establishing the local TLS connection, for a purpose of authenticating an identity of the companion terminal, a local TLS connection may be established based on a certificate authentication manner. Further, after sending a TLS connection establishment request to the companion terminal, the primary terminal receives a certificate sent by the companion terminal. In this case, the primary terminal authenticates the certificate sent by the companion terminal according to a CA root certificate of the primary terminal, and determines that the identity of the companion terminal is authenticated after the certificate is authenticated. In addition, the primary terminal completes establishment of the local TLS connection after the identity of the companion terminal is authenticated. If the primary terminal determines that the identity of the companion terminal is not authenticated, the local TLS connection establishment may be terminated.

In the third step, after establishment of the local TLS connection is completed, the primary terminal may send the HTTP request including the security information to the companion terminal using the established local TLS connection in order to complete establishment of an HTTPS session.

Step 102: The companion terminal receives the HTTP request that is sent by the primary terminal using the local TLS connection, and if the companion terminal determines that the HTTP request includes the security information, returns an HTTP response to the primary terminal in order to complete establishment of an HTTPS session.

In step 102, after the companion terminal receives the HTTP request that is sent by the primary terminal using the local TLS connection, if the HTTP request includes the security information, it is determined that permission of the primary terminal is authenticated, and an HTTP response is returned to the primary terminal such that establishment of an HTTPS session is completed, otherwise, the companion terminal refuses the HTTP request sent by the primary terminal, and then a process of establishing the HTTPS session ends.

It should be noted that, in a process of establishing the local TLS connection, the companion terminal and the primary terminal may negotiate respective encryption keys and integrity keys. For a process of generating the encryption key and the integrity key and a method for using the encryption key and the integrity key, refer to stipulations in the TLS protocol, and details are not described herein.

Step 203: The primary terminal sends an operation instruction for the eUICC to the companion terminal using the HTTPS session.

In step 203, after establishment of an HTTPS session is completed, the primary terminal may send the operation instruction for the eUICC to the companion terminal, for example, an operation such as deleting the profile from the eUICC, or downloading the profile to the eUICC.

In a process of establishing an HTTPS session, the primary terminal performs identity authentication on the companion terminal, and the companion terminal authenticates permission of the primary terminal. In addition, encryption and integrity protection are performed on the operation instruction transmitted by the primary terminal. Therefore, the companion terminal responds to the operation instruction of the primary terminal.

Correspondingly, step 103: The companion terminal receives the operation instruction for the eUICC that is sent by the primary terminal using the HTTPS session.

In step 103, the companion terminal may further send a response message of the operation instruction for the eUICC to the primary terminal.

In the foregoing solution, the companion terminal with an eUICC authenticates permission of the primary terminal using the security information. In addition, the primary terminal authenticates an identity of the companion terminal using a certificate of the companion terminal such that authentication between the primary terminal and the companion terminal are implemented. In addition, the operation instruction for the eUICC is sent and received between the primary terminal and the companion terminal using an HTTPS session, thereby improving confidentiality and integrity of an operation command in a transmission process.

Figure 2:
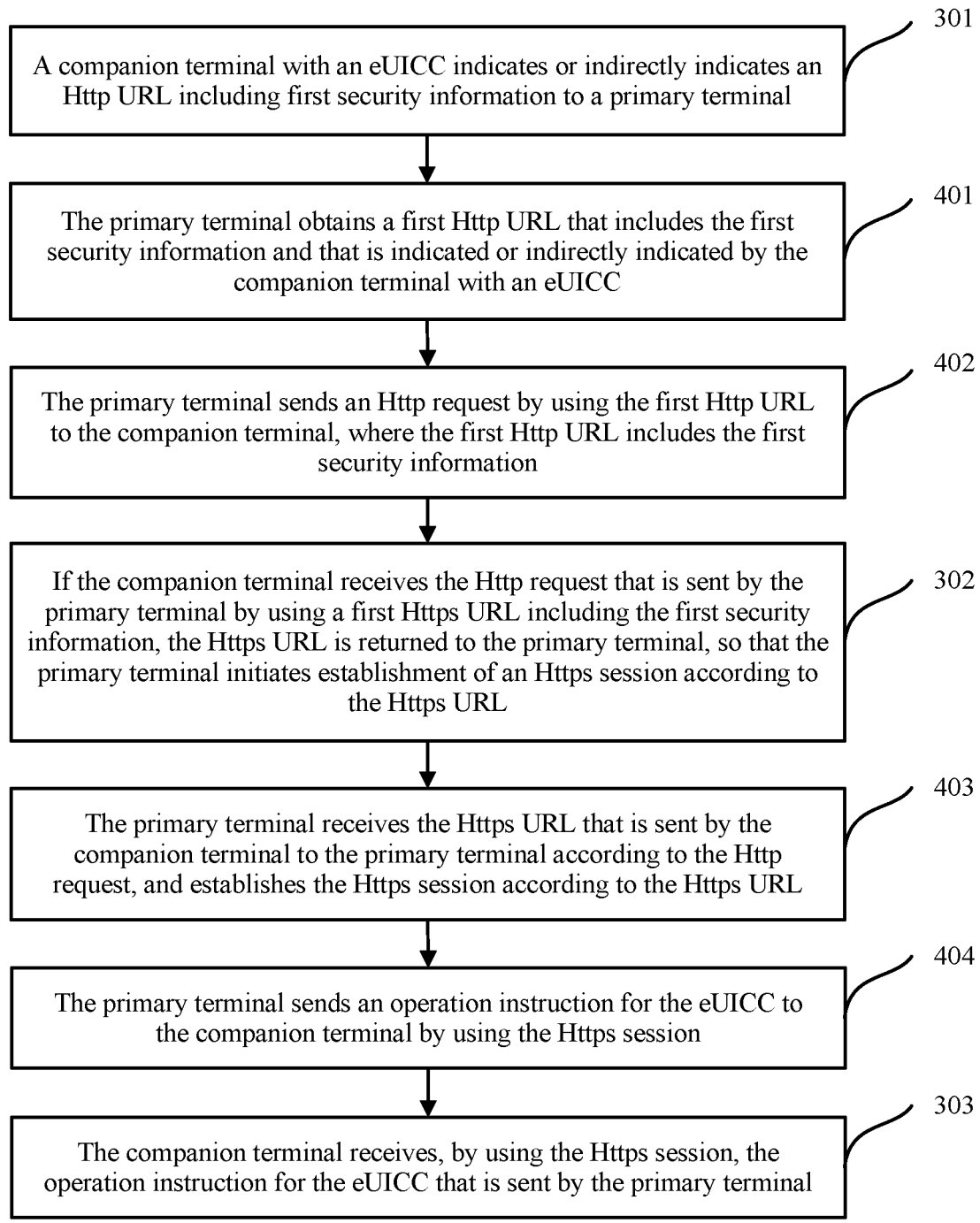
FIG. 2 is a schematic flowchart of a method for secure interaction between terminals according to an embodiment of the present disclosure.

Based on the foregoing description, FIG. 2 shows a schematic flowchart of a method for secure interaction between terminals according to an embodiment of the present disclosure.

As shown in FIG. 2, the method includes the following steps.

Step 301: A companion terminal with an eUICC indicates or indirectly indicates an HTTP URL including first security information to a primary terminal.

In step 301, the first security information may be a random number generated by the companion terminal, or may be information such as a preset token in the companion terminal, and this is not limited in the present disclosure.

A first HTTP URL generated by the companion terminal may include a used protocol name, address information of the companion terminal, and the first security information. The used protocol name indicated in the first HTTP URL may be HTTP, and the address information of the companion terminal may be an IP address.

For example, an LPA in the companion terminal may obtain, using an OS of the companion terminal, an IP address that is allocated by the primary terminal to the companion terminal, and generates a token as the first security information. In this case, the generated first HTTP URL may be http://192.168.0.x/LPA? eUICC_access token=xxxxxx. The address information of the companion terminal is 192.168.0.x, and a name of the first security information is eUICC_access token.

The companion terminal may directly indicate the first HTTP URL to the primary terminal, or may indirectly indicate the first HTTP URL to the primary terminal.

When the companion terminal directly indicates the first HTTP URL to the primary terminal, the companion terminal may directly send the HTTPS URL to the primary terminal.

For example, the companion terminal may transfer the first HTTP URL to the primary terminal in an NFC manner.

Alternatively, the companion terminal may display a graph after converting the first HTTP URL into the graph in order to indicate the first HTTP URL to the primary terminal. For example, the companion terminal may display a quick response code on a display unit of the companion terminal after converting the first HTTP URL into the quick response code such that the primary terminal scans the quick response code displayed by the companion terminal to obtain the first HTTP URL. Certainly, alternatively, the companion terminal may send the first HTTP URL to the primary terminal after converting the first HTTP URL into a graph.

Alternatively, the companion terminal may indirectly indicate the first HTTP URL to the primary terminal. The companion terminal directly displays the first HTTP URL, and a user may input the displayed first HTTP URL to the primary terminal. Certainly, alternatively, the primary terminal may scan the first HTTP URL displayed by the companion terminal, and identify, using a character recognition algorithm, the first HTTP URL obtained by means of scanning.

Step 401: The primary terminal obtains a first HTTP URL that includes the first security information and that is indicated or indirectly indicated by the companion terminal with an eUICC.

In step 401, the primary terminal may obtain, in an NFC manner, the first HTTP URL sent by the companion terminal. The primary terminal may also obtain the first HTTP URL by scanning a graph into which the first HTTP URL is converted. For another manner in which the primary terminal obtains the first HTTP URL, refer to the foregoing description, and details are not described herein again.

Step 402: The primary terminal sends an HTTP request using the first HTTP URL to the companion terminal, where the first HTTP URL includes the first security information.

In step 402, the primary terminal initiates, using the address information of the companion terminal in the HTTP URL, the HTTP request used for establishing an HTTPS session.

For example, the first HTTP URL is http://192.168.0.x/ LPA? eUICC_access token=xx. The primary terminal initiates the HTTP request using the address information 192.168.0.x of the companion terminal.

The first HTTP URL including the first security information is carried in the HTTP request by the primary terminal such that permission of the primary terminal can be authenticated by the companion terminal. If no first HTTP URL including the first security information is carried in the HTTP request by the primary terminal, or an incorrect first HTTP URL including the first security information is carried, the companion terminal considers that the primary terminal does not obtain the first URL and therefore has no access permission, and no longer responds to a message sent by the primary terminal. If the first HTTP URL including the first security information is carried in the HTTP request by the primary terminal, the companion terminal may determine, according to the first security information, that the permission of the primary terminal is authenticated.

Step 302: If the companion terminal receives the HTTP request that is sent by the primary terminal using a first HTTPS URL including the first security information, the HTTPS URL is returned to the primary terminal such that the primary terminal initiates establishment of an HTTPS session according to the HTTPS URL.

In step 302, after sending the first HTTPS URL to the primary terminal, the companion terminal receives the HTTP request sent by the primary terminal. If the companion terminal determines that the received HTTP request carries the first HTTPS URL including the first security information, the companion terminal determines that the permission of the primary terminal is authenticated, and responds to the HTTP request sent by the primary terminal, otherwise, the companion terminal determines that the permission of the primary terminal is not authenticated, and refuses the HTTP request sent by the primary terminal.

After the permission of the primary terminal is authenticated, the companion terminal may return the HTTPS URL to the primary terminal, where the HTTPS URL is a redirected HTTPS URL such that the primary terminal initiates establishment of an HTTPS session according to the HTTPS URL.

Optionally, if the companion terminal receives the HTTP request that is sent by the primary terminal using the first HTTPS URL including the first security information, the companion terminal may further send, to the primary terminal, a second HTTP URL used for downloading a CA root certificate. The primary terminal may download the CA root certificate according to the second HTTP URL such that the primary terminal establishes a local TLS connection to the companion terminal according to the CA root certificate based on a certificate authentication manner.

Certainly, alternatively, the CA root certificate may be pre-configured in the primary terminal, and in this case, the companion terminal may not need to send the second HTTP URL to the primary terminal.

Optionally, the HTTPS URL sent by the companion terminal may further include second security information. The second security information may be information such as a random number or a token generated by the companion terminal. The second security information is used to authenticate the primary terminal after the local TLS connection is established.

Step 403: The primary terminal receives the HTTPS URL that is sent by the companion terminal to the primary terminal according to the HTTP request, and establishes the HTTPS session according to the HTTPS URL.

In step 403, establishment of an HTTPS session generally includes three steps. In a first step, a TCP connection is established. The TCP connection is used to establish a transmission connection between the primary terminal and the companion terminal, and this step is a step prior to establishment of a TLS connection. In a second step, the local TLS connection is established. Encryption and integrity protection for HTTP transmission data are implemented using the TLS connection. In a third step, an HTTP request is sent, and an HTTP response is received. After establishment of the TLS connection is completed, the primary terminal sends an HTTP request to the companion terminal using the local TLS connection, after receiving the HTTP request, the companion terminal returns an HTTP response to the primary terminal, and establishment of an HTTPS session is completed after the primary terminal receives the HTTP response.

In the first step, the primary terminal initiates, using address information of the companion terminal in the HTTPS URL, the TCP connection used for establishing an HTTPS session.

For example, the HTTPS URL is https://192.168.0.x/ LPA? eUICC_access token=xx. The primary terminal initiates the TCP connection to the companion terminal according to the address information 192.168.0.x.

In this case, the companion terminal receives a TCP connection request sent by the primary terminal.

Optionally, after the companion terminal receives the TCP connection request sent by the primary terminal, if the companion terminal determines that a source IP address of the TCP connection request sent by the primary terminal is different from a source IP address of the HTTP request returned by the primary terminal according to the first HTTP URL including the first security information, the companion terminal does not respond to the TCP connection request sent by the primary terminal, or if the companion terminal determines that the source IP address of the TCP connection request sent by the primary terminal is the same as the source IP address of the HTTP request returned by the primary terminal according to the first HTTP URL including the first security information, the companion terminal responds to the TCP connection request sent by the primary terminal in order to complete establishment of the TCP connection.

In the second step, after establishment of the TCP connection is completed, the primary terminal initiates a process of establishing a local TLS connection. In this embodiment of the present disclosure, the local TLS connection is established based on a certificate authentication manner. Further, in the process of establishing the local TLS connection, for a purpose of authenticating an identity of the companion terminal, after sending a TLS connection establishment request to the companion terminal, the primary terminal receives a certificate sent by the companion terminal. In this case, the primary terminal authenticates the certificate sent by the companion terminal according to a CA root certificate of the primary terminal, and determines that the identity of the companion terminal is authenticated after the certificate is authenticated. In addition, the primary terminal completes establishment of the local TLS connection after the identity of the companion terminal is authenticated. If the primary terminal determines that the identity of the companion terminal is not authenticated, the local TLS connection establishment may be terminated.

In the third step, after establishment of the local TLS connection is completed, the primary terminal may send the HTTP request to the companion terminal using the established local TLS connection in order to complete establishment of an HTTPS session.

Optionally, in the third step, if the HTTPS URL sent by the companion terminal further includes second security information, after the local TLS connection is established, the primary terminal may send an HTTP request including the second security information to the companion terminal using the established local TLS connection in order to complete establishment of an HTTPS session.

If the companion terminal receives the HTTP request that includes the second security information and that is sent by the primary terminal using the local TLS connection, the companion terminal returns an HTTP response to the primary terminal to complete establishment of an HTTPS session in order to respond to an operation instruction for the eUICC that is sent by the primary terminal. Otherwise, the HTTP request sent by the primary terminal is refused, and then a process of establishing the HTTPS session ends.

Step 404: The primary terminal sends an operation instruction for the eUICC to the companion terminal using the HTTPS session.

In step 404, the primary terminal may send the operation instruction for the eUICC to the companion terminal, for example, an operation such as deleting the profile from the eUICC, or downloading the profile to the eUICC.

In a process of establishing an HTTPS session, the primary terminal authenticates an identity of the companion terminal, and the companion terminal authenticates a permission of the primary terminal such that authentication between the primary terminal and the companion terminal are implemented. Therefore, the companion terminal responds to the operation instruction of the primary terminal.

Correspondingly, step 303: The companion terminal receives the operation instruction for the eUICC that is sent by the primary terminal using the HTTPS session.

Likewise, the companion terminal may send a response message of the operation instruction for the eUICC to the primary terminal using the HTTPS session.

It should be noted that, in this embodiment of the present disclosure, the primary terminal may initiate, using a browser or an application that has a function of a browser and based on address information of the companion terminal in an HTTP URL, an HTTP request used for establishing an HTTPS session, and establishes a local TLS connection to the companion terminal based on a certificate authentication manner using an HTTPS URL.

Figure 3:
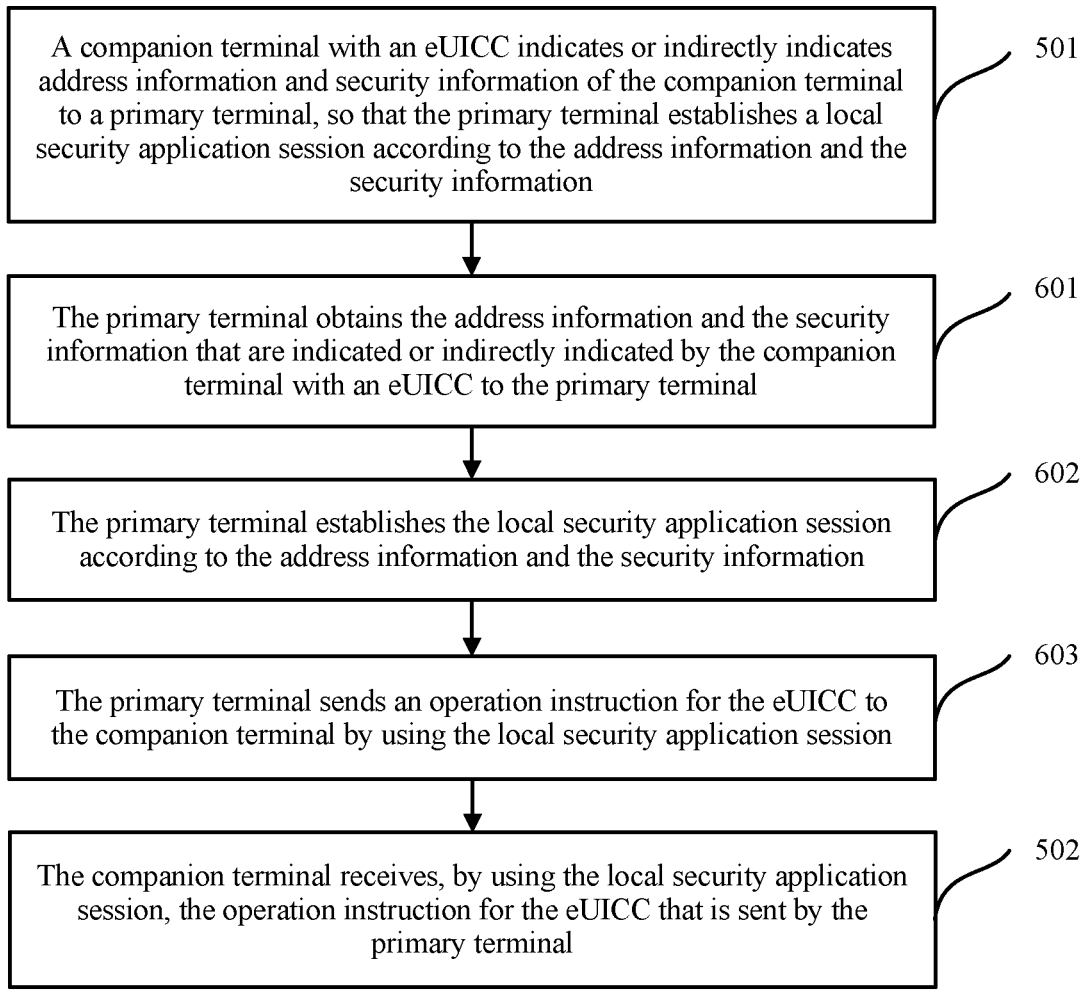
FIG. 3 is a schematic flowchart of a method for secure interaction between terminals according to an embodiment of the present disclosure.

Based on the foregoing description, FIG. 3 shows a schematic flowchart of a method for secure interaction between terminals according to an embodiment of the present disclosure.

As shown in FIG. 3, the method includes the following steps.

Step 501: A companion terminal with an eUICC indicates or indirectly indicates address information and security information of the companion terminal to a primary terminal such that the primary terminal establishes a local security application session according to the address information and the security information.

In step 501, the security information may be a secret key generated by the companion terminal, or may be key information of a local connection between the companion terminal and the primary terminal. For example, a link key that is used in a BLUETOOTH connection manner is used as the security information, or a WI-FI key that is used in a WI-FI connection manner is used as the security information.

The address information of the companion terminal may be an IP address, or may be a Media Access Control (MAC) address of the companion terminal.

The companion terminal may directly indicate the address information and the security information to the primary terminal, or may indirectly indicate the address information and the security information to the primary terminal.

When the companion terminal directly indicates the address information and the security information to the primary terminal, the companion terminal may directly send the address information and the security information to the primary terminal.

For example, the companion terminal may transfer the address information and the security information to the primary terminal in an NFC manner.

Alternatively, the companion terminal may display a graph after converting the address information and the security information into the graph, and indicates the address information and the security information to the primary terminal. For example, the companion terminal may display a quick response code on a display unit of the companion terminal after converting the address information and the security information into the quick response code such that the primary terminal scans the quick response code displayed by the companion terminal to obtain the address information and the security information. Certainly, alternatively, the companion terminal may send the address information and the security information to the primary terminal after converting the address information and the security information into the graph.

For example, the companion terminal may convert the address information and the security information into an HTTPS URL, and display a quick response code on a display unit of the companion terminal after converting the HTTPS URL into the quick response code such that the primary terminal scans the quick response code displayed by the companion terminal to obtain the address information and the security information.

The companion terminal may further indicate protocol information to the primary terminal, such as the HTTPS protocol.

Alternatively, the companion terminal may indirectly indicate the address information and the security information to the primary terminal. The companion terminal directly displays the address information and the security information, and a user may input the displayed address information and security information to the primary terminal. Alternatively, the primary terminal may scan the address information and the security information that are displayed by the companion terminal, and identify, using a character recognition algorithm, the address information and the security information that are obtained by means of scanning.

Step 601: The primary terminal obtains the address information and the security information that are indicated or indirectly indicated by the companion terminal with an eUICC to the primary terminal.

The primary terminal may obtain, in an NFC manner, the address information and the security information that are sent by the companion terminal. The primary terminal may obtain the address information and the security information by scanning a graph into which the address information and the security information are converted. For another manner in which the primary terminal obtains the address information and the security information, refer to the foregoing description, and details are not described herein again.

Step 602: The primary terminal establishes the local security application session according to the address information and the security information.

In step 602, the primary terminal may establish the local security application session between the primary terminal and the companion terminal in multiple manners, and the established local security application session is used to provide encryption and integrity protection for data between the primary terminal and the companion terminal.

If the security information is a secret key generated by the companion terminal, the secret key may be used as a pre-shared key (also referred as PSK) such that the companion terminal and the primary terminal perform mutual authentication using the pre-shared key and establish the local security application session. The pre-shared key is secret information that is shared by only the primary terminal and the companion terminal, and is used by the companion terminal and the primary terminal to mutually perform identity authentication and key negotiation.

For example, the security information is a secret key generated by the companion terminal, and the secret key is used as a TLS-PSK. That the established local security application session is an HTTPS session is used as an example for detailed description. An HTTPS URL generated by the companion terminal according to the address information and the security information is https://192.168.0.x/LPA? eUICC_access token=xxxxxx, where the address information of the companion terminal is 192.168.0.x, and a name of the security information is eUICC_access token. After obtaining the HTTPS URL generated by the companion terminal, the primary terminal may trigger the HTTPS URL using an application in order to initiate establishment of the HTTPS session between the primary terminal and the companion terminal. The primary terminal initiates a TCP connection to the companion terminal according to the address information 192.168.0.x. After the TCP connection between the primary terminal and the companion terminal is established, a PSK-TLS connection is established between the companion terminal and the primary terminal. In a process of establishing the PSK-TLS connection, the primary terminal calculates a Pre-Master Secret (or pre-master secret key) using the security information. Then the primary terminal may obtain a Master Secret (or master secret key) according to the Pre-Master Secret using a pseudo random function (PRF) algorithm, and finally the primary terminal obtains a key block according to the Master Secret using the PRF algorithm such that an encryption key and an integrity key that are used by the primary terminal and the companion terminal are obtained according to the key block. Correspondingly, the companion terminal calculates a key block according to the security information (that is, the secret key generated by the companion terminal) in a manner that is the same as that of the primary terminal such that the encryption key and the integrity key that are used by the primary terminal and the companion terminal are obtained according to the key block. In addition, the primary terminal and the companion terminal perform mutual authentication according to the TLS-PSK, and establishment of the PSK-TLS connection is completed after the authentication succeeds. Finally, the primary terminal sends an HTTP request to the companion terminal using the PSK-TLS connection, the companion terminal returns an HTTP response to the primary terminal after receiving the HTTP request, and establishment of the HTTPS session is completed after the primary terminal receives the HTTP response.

Key information of a local connection between the primary terminal and the companion terminal may be used as a pre-shared key, and the primary terminal and the companion terminal perform mutual authentication using the pre-shared key. After the companion terminal and the primary terminal perform mutual authentication using the key information, if security information sent by the primary terminal is received, establishment of the local security application session is completed.

For example, the key information of the local connection is used as a TLS-PSK, and that the established local security application session is an HTTPS session is used as an example for detailed description. An HTTPS URL generated by the companion terminal according to the address information and the security information is https://192.168.0.x/LPA? eUICC_access token=xxxxxx, where the address information of the companion terminal is 192.168.0.x, and a name of the security information is eUICC_access token. After the primary terminal obtains the HTTPS URL generated by the companion terminal, the primary terminal may trigger the HTTPS URL using an application in order to initiate establishment of the HTTPS session between the primary terminal and the companion terminal. The primary terminal initiates a TCP connection to the companion terminal according to the address information 192.168.0.x. After the TCP connection between the primary terminal and the companion terminal is established, a PSK-TLS connection is established between the companion terminal and the primary terminal. In a process of establishing the TLS connection, the primary terminal uses the key information of the local connection as a TLS-PSK, and calculates a key block according to the TLS-PSK such that an encryption key and an integrity key that are used by the primary terminal and the companion terminal are obtained according to the key block. Correspondingly, the companion terminal uses a security key of the local connection as security information, and calculates a key block according to the security information in a manner that is the same as that of the primary terminal such that the encryption key and the integrity key that are used by the primary terminal and the companion terminal are obtained according to the key block. In addition, the primary terminal and the companion terminal perform mutual authentication according to the TLS-PSK, and establishment of the PSK-TLS connection is completed after the authentication succeeds. Finally, the primary terminal sends an HTTP request to the companion terminal using the PSK-TLS connection, if security information sent by the primary terminal is received, the companion terminal returns an HTTP response to the primary terminal after receiving the HTTP request, and establishment of the HTTPS session is completed after the primary terminal receives the HTTP response.

It should be noted that, the foregoing embodiment is described using the IP protocol as an example, and a local security application session may be established using a non-IP protocol. Details are not described herein.

Step 603: The primary terminal sends an operation instruction for the eUICC to the companion terminal using the local security application session.

Step 502: The companion terminal receives, using the local security application session, the operation instruction for the eUICC that is sent by the primary terminal. It should be noted that, in this embodiment of the present disclosure, the primary terminal may establish the local security application session according to an application according to the address information and the security information.

Figure 4:
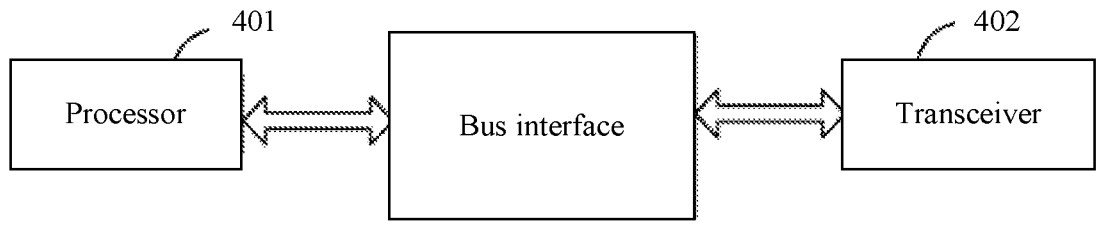
FIG. 4 is a schematic structural diagram of an apparatus for secure interaction between terminals according to an embodiment of the present disclosure.

Based on the foregoing description, FIG. 4 shows a schematic structural diagram of an apparatus for secure interaction between terminals according to an embodiment of the present disclosure.

As shown in FIG. 4, the apparatus includes a processor 401 configured to indicate or indirectly indicate an HTTPS URL including security information to a primary terminal such that the primary terminal establishes a local TLS connection to the companion terminal based on a certificate authentication manner according to the HTTPS URL, and a transceiver 402 configured to receive an HTTP request that is sent by the primary terminal using the local TLS connection, and if the companion terminal determines that the HTTP request includes the security information, return an HTTP response to the primary terminal in order to complete establishment of an HTTPS session, and receive an operation instruction for the eUICC that is sent by the primary terminal using the HTTPS session.

Optionally, the processor 401 is further configured to transfer the HTTPS URL including the security information to the primary terminal, directly display the HTTPS URL including the security information in order to indirectly indicate the HTTPS URL to the primary terminal, or display a graph of the HTTPS URL including the security information in order to indirectly indicate the HTTPS URL to the primary terminal.

Figure 5:
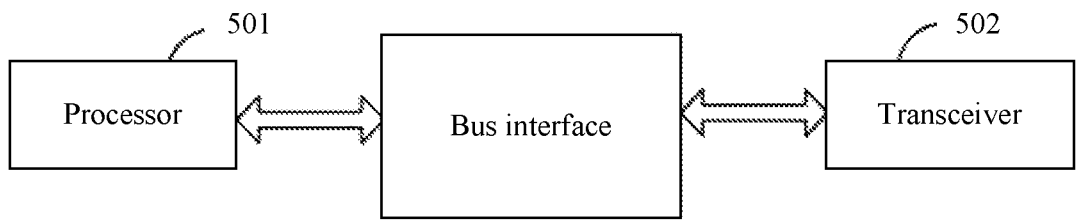
FIG. 5 is a schematic structural diagram of an apparatus for secure interaction between terminals according to an embodiment of the present disclosure.

As shown in FIG. 5, an embodiment of the present disclosure provides a schematic structural diagram of an apparatus for secure interaction between terminals, and the apparatus includes a processor 501 configured to obtain an HTTPS URL that includes security information and that is indicated or indirectly indicated by a companion terminal with an eUICC, and establish a local TLS connection to the companion terminal based on a certificate authentication manner according to the HTTPS URL, send an HTTP request including the security information to the companion terminal using the local TLS connection, and complete establishment of an HTTPS session after receiving an HTTP response returned by the companion terminal, and a transceiver 502 configured to send an operation instruction for the eUICC to the companion terminal using the HTTPS session.

Figure 6:
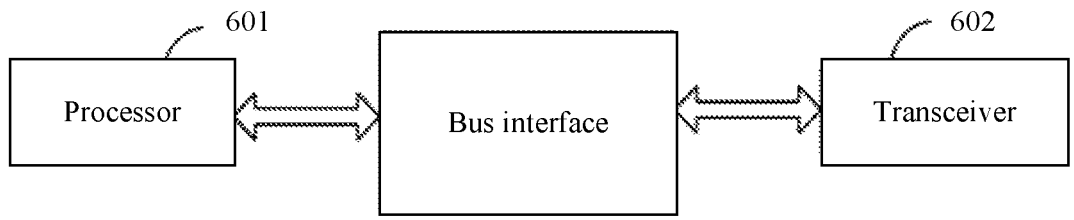
FIG. 6 is a schematic structural diagram of an apparatus for secure interaction between terminals according to an embodiment of the present disclosure.

As shown in FIG. 6, an embodiment of the present disclosure provides a schematic structural diagram of an apparatus for secure interaction between terminals, and the apparatus includes a processor 601 configured to indicate or indirectly indicate an HTTP URL including first security information to a primary terminal, and a transceiver 602 configured to return the HTTPS URL to the primary terminal if an HTTP request that is sent by the primary terminal using a first HTTPS URL including the first security information is received such that the primary terminal initiates establishment of an HTTPS session according to the HTTPS URL, and receive, using the HTTPS session, an operation instruction for the eUICC that is sent by the primary terminal.

Optionally, the processor 601 is further configured to transfer the HTTP URL including the first security information to the primary terminal, directly display the HTTP URL including the first security information in order to indirectly indicate the HTTP URL to the primary terminal, or display a graph of the HTTP URL including the first security information in order to indirectly indicate the HTTP URL to the primary terminal.

Optionally, the transceiver 602 is further configured to return, to the primary terminal, a second HTTP URL used for downloading a CA root certificate, where the CA root certificate is used by the primary terminal to establish a local TLS connection to the companion terminal based on a certificate authentication manner.

Optionally, the transceiver 602 is further configured to receive a TCP connection request that is sent by the primary terminal according to the HTTPS URL, and if a source IP address of the TCP connection request is the same as a source IP address of the HTTP request, respond to the TCP connection request in order to complete TCP connection establishment.

Optionally, the HTTPS URL includes second security information, and the transceiver 602 is configured to complete establishment of the HTTPS session if the second security information sent by the primary terminal is received.

Figure 7:
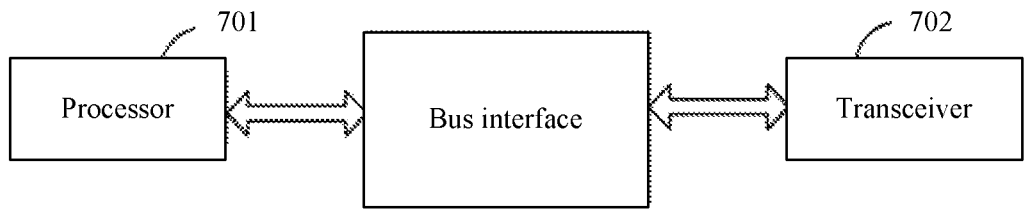
FIG. 7 is a schematic structural diagram of an apparatus for secure interaction between terminals according to an embodiment of the present disclosure.

As shown in FIG. 7, an embodiment of the present disclosure provides a schematic structural diagram of an apparatus for secure interaction between terminals, and the apparatus includes a processor 701 configured to obtain a first HTTP URL that includes first security information and that is indicated or indirectly indicated by a companion terminal with an eUICC, and a transceiver 702 configured to send an HTTP request including the first HTTP URL to the companion terminal, where the first HTTP URL includes the first security information, receive an HTTPS URL that is sent by the companion terminal to the primary terminal according to the HTTP request, initiate establishment of an HTTPS session according to the HTTPS URL, and send an operation instruction for the eUICC to the companion terminal using the HTTPS session.

Optionally, the processor 701 is further configured to receive the HTTP URL that includes the first security information and that is transferred by the companion terminal, obtain the HTTP URL using the HTTP URL that includes the first security information and that is directly displayed by the companion terminal, or obtain the HTTP URL by scanning a graph of the HTTP URL including the first security information.

Optionally, the transceiver 702 is further configured to receive a second HTTP URL that is used for downloading a CA root certificate and that is sent by the companion terminal, and establish a local TLS connection to the companion terminal according to the CA root certificate based on a certificate authentication manner.

Optionally, after the primary terminal receives the HTTPS URL that is sent by the companion terminal to the primary terminal according to the HTTP request including the first security information, the transceiver 702 is further configured to send a TCP connection request to the companion terminal according to the HTTPS URL such that the companion terminal responds to the TCP connection request according to a source IP address of the TCP connection request and a source IP address of the HTTP request.

Optionally, the HTTPS URL includes second security information, and the transceiver 702 is configured to send the second security information to the companion terminal such that the companion terminal completes establishment of the HTTPS session after receiving the second security information.

Figure 8:
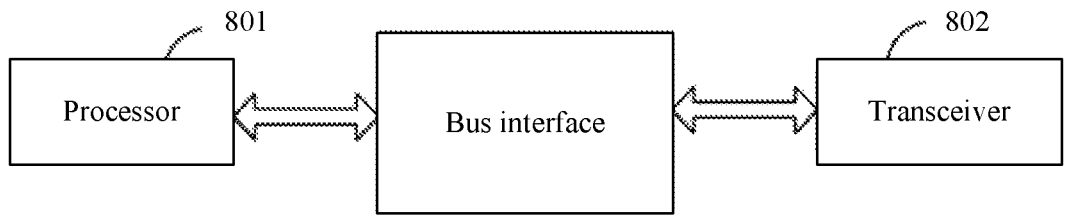
FIG. 8 is a schematic structural diagram of an apparatus for secure interaction between terminals according to an embodiment of the present disclosure.

As shown in FIG. 8, an embodiment of the present disclosure provides a schematic structural diagram of an apparatus for secure interaction between terminals, and the apparatus includes a processor 801 configured to indicate or indirectly indicate address information and security information of a companion terminal to a primary terminal such that the primary terminal establishes a local security application session according to the address information and the security information, and a transceiver 802 configured to receive, using the local security application session, an operation instruction for the eUICC that is sent by the primary terminal.

Optionally, the processor 801 is further configured to transfer the address information and the security information to the primary terminal, directly display the address information and the security information in order to indirectly indicate the address information and the security information to the primary terminal, or display a graph including the address information and the security information in order to indirectly indicate the address information and the security information to the primary terminal.

Optionally, the security information is used as a pre-shared key such that the companion terminal and the primary terminal perform mutual authentication using the pre-shared key and establish a local security application session.

Optionally, the transceiver 802 is further configured to receive a local security application session request of the primary terminal, and use obtained key information of a local connection as a pre-shared key, and after the companion terminal and the primary terminal perform mutual authentication using the pre-shared key, if security information sent by the primary terminal is received, complete establishment of the local security application session.

Figure 9:
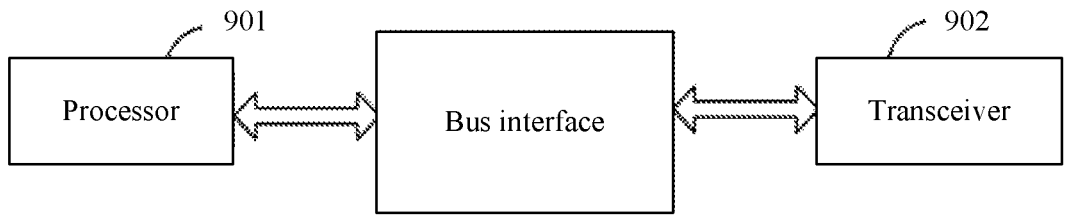
FIG. 9 is a schematic structural diagram of an apparatus for secure interaction between terminals according to an embodiment of the present disclosure.

As shown in FIG. 9, an embodiment of the present disclosure provides a schematic structural diagram of an apparatus for secure interaction between terminals, and the apparatus includes a processor 901 configured to obtain address information and security information that are indicated or indirectly indicated by a companion terminal with an eUICC to a primary terminal, and establish a local security application session according to the address information and the security information, and a transceiver 902 configured to send an operation instruction for the eUICC to the companion terminal using the local security application session.

Optionally, the processor 901 is further configured to receive the address information and the security information that are transferred by the companion terminal, obtain the address information and the security information using the address information and the security information that are directly displayed by the companion terminal, or obtain the address information and the security information by scanning a graph including the address information and the security information.

Optionally, the security information is used as a pre-shared key such that the primary terminal and the companion terminal perform mutual authentication using the pre-shared key and establish a local security application session.

Optionally, the processor 901 is further configured to send a local security application session request to the companion terminal, and use obtained key information of a local connection as a pre-shared key, and after the primary terminal and the companion terminal perform mutual authentication using the pre-shared key, send the security information to the companion terminal such that the companion terminal completes establishment of the local security application session after determining that the security information sent by the primary terminal is received.

Figure 10:
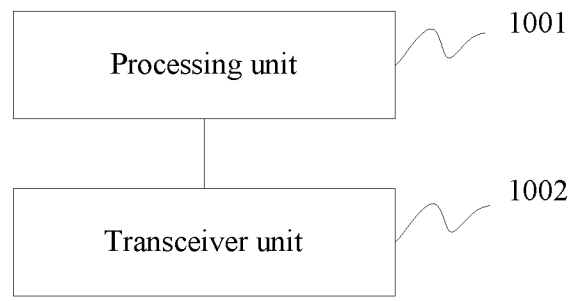
FIG. 10 is a schematic structural diagram of an apparatus for secure interaction between terminals according to an embodiment of the present disclosure.

As shown in FIG. 10, an embodiment of the present disclosure provides a schematic structural diagram of an apparatus for secure interaction between terminals, and the apparatus includes a processing unit 1001 configured to indicate or indirectly indicate an HTTPS URL including security information to a primary terminal such that the primary terminal establishes a local TLS connection to the companion terminal based on a certificate authentication manner according to the HTTPS URL, and a transceiver unit 1002 configured to receive an HTTP request that is sent by the primary terminal using the local TLS connection, if the companion terminal determines that the HTTP request includes the security information, return an HTTP response to the primary terminal in order to complete establishment of an HTTPS session, and receive an operation instruction for the eUICC that is sent by the primary terminal using the HTTPS session.

Optionally, the processing unit 1001 is further configured to transfer the HTTPS URL including the security information to the primary terminal, directly display the HTTPS URL including the security information in order to indirectly indicate the HTTPS URL to the primary terminal, or display a graph of the HTTPS URL including the security information in order to indirectly indicate the HTTPS URL to the primary terminal.

Figure 11:
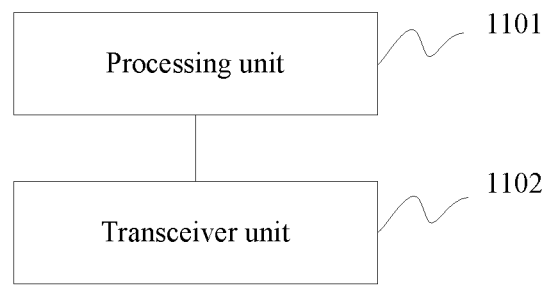
FIG. 11 is a schematic structural diagram of an apparatus for secure interaction between terminals according to an embodiment of the present disclosure.

As shown in FIG. 11, an embodiment of the present disclosure provides a schematic structural diagram of an apparatus for secure interaction between terminals, and the apparatus includes a processing unit 1101 configured to obtain an HTTPS URL that includes security information and that is indicated or indirectly indicated by a companion terminal with an eUICC, and establish a local TLS connection to the companion terminal based on a certificate authentication manner according to the HTTPS URL, send an HTTP request including the security information to the companion terminal using the local TLS connection, and complete establishment of an HTTPS session after receiving an HTTP response returned by the companion terminal, and a transceiver unit 1102 configured to send an operation instruction for the eUICC to the companion terminal using the HTTPS session.

Figure 12:
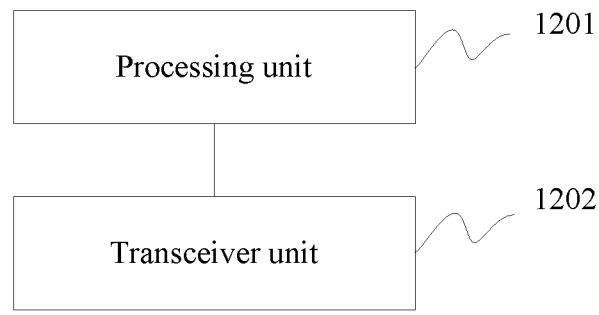
FIG. 12 is a schematic structural diagram of an apparatus for secure interaction between terminals according to an embodiment of the present disclosure.

As shown in FIG. 12, an embodiment of the present disclosure provides a schematic structural diagram of an apparatus for secure interaction between terminals, and the apparatus includes a processing unit 1201 configured to indicate or indirectly indicate an HTTP URL including first security information to a primary terminal, and a transceiver unit 1202 configured to if an HTTP request that is sent by the primary terminal using a first HTTPS URL including the first security information is received, return the HTTPS URL to the primary terminal such that the primary terminal initiates establishment of an HTTPS session according to the HTTPS URL, and receive, using the HTTPS session, an operation instruction for the eUICC that is sent by the primary terminal.

Optionally, the processing unit 1201 is further configured to transfer the HTTP URL including the first security information to the primary terminal, directly display the HTTP URL including the first security information in order to indirectly indicate the HTTP URL to the primary terminal, or display a graph of the HTTP URL including the first security information in order to indirectly indicate the HTTP URL to the primary terminal.

Optionally, the transceiver unit 1202 is further configured to return, to the primary terminal, a second HTTP URL used for downloading a CA root certificate, where the CA root certificate is used by the primary terminal to establish a local TLS connection to the companion terminal based on a certificate authentication manner.

Optionally, the transceiver unit 1202 is further configured to receive a TCP connection request that is sent by the primary terminal according to the HTTPS URL, and if a source IP address of the TCP connection request is the same as a source IP address of the HTTP request, respond to the TCP connection request in order to complete TCP connection establishment.

Optionally, the HTTPS URL includes second security information, and the transceiver unit 1202 is configured to complete establishment of the HTTPS session if the second security information sent by the primary terminal is received.

Figure 13:
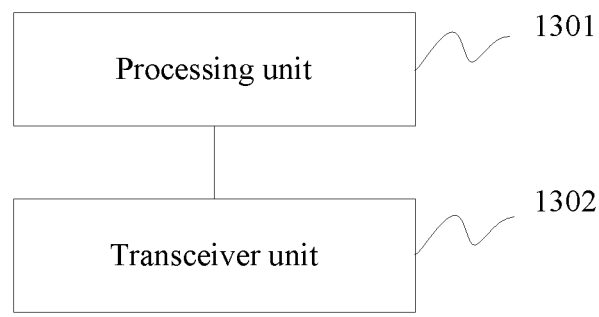
FIG. 13 is a schematic structural diagram of an apparatus for secure interaction between terminals according to an embodiment of the present disclosure.

As shown in FIG. 13, an embodiment of the present disclosure provides a schematic structural diagram of an apparatus for secure interaction between terminals, and the apparatus includes a processing unit 1301 configured to obtain a first HTTP URL that includes first security information and that is indicated or indirectly indicated by a companion terminal with an eUICC, and a transceiver unit 1302 configured to send an HTTP request including the first HTTP URL to the companion terminal, where the first HTTP URL includes the first security information, and receive an HTTPS URL that is sent by the companion terminal to the primary terminal according to the HTTP request, and initiate establishment of an HTTPS session according to the HTTPS URL, and send an operation instruction for the eUICC to the companion terminal using the HTTPS session.

Optionally, the processing unit 1301 is further configured to receive the HTTP URL that includes the first security information and that is transferred by the companion terminal, obtain the HTTP URL using the HTTP URL that includes the first security information and that is directly displayed by the companion terminal, or obtain the HTTP URL by scanning a graph of the HTTP URL including the first security information.

Optionally, the transceiver unit 1302 is further configured to receive a second HTTP URL that is used for downloading a CA root certificate and that is sent by the companion terminal, and establish a local TLS connection to the companion terminal according to the CA root certificate based on a certificate authentication manner.

Optionally, after the primary terminal receives the HTTPS URL that is sent by the companion terminal to the primary terminal according to the HTTP request including the first security information, the transceiver unit 1302 is further configured to send a TCP connection request to the companion terminal according to the HTTPS URL such that the companion terminal responds to the TCP connection request according to a source IP address of the TCP connection request and a source IP address of the HTTP request.

Optionally, the HTTPS URL includes second security information, and the transceiver unit 1302 is configured to send the second security information to the companion terminal such that the companion terminal completes establishment of the HTTPS session after receiving the second security information.

Figure 14:
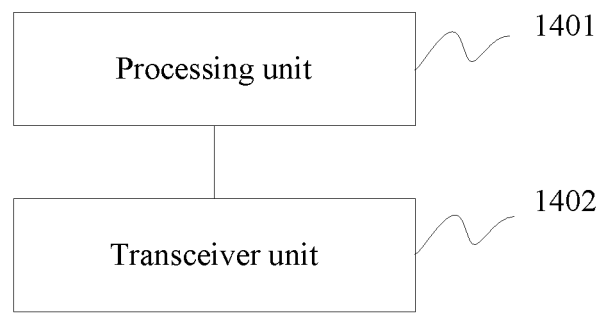
FIG. 14 is a schematic structural diagram of an apparatus for secure interaction between terminals according to an embodiment of the present disclosure.

As shown in FIG. 14, an embodiment of the present disclosure provides a schematic structural diagram of an apparatus for secure interaction between terminals, and the apparatus includes a processing unit 1401 configured to indicate or indirectly indicate address information and security information of a companion terminal to a primary terminal such that the primary terminal establishes a local security application session according to the address information and the security information, and a transceiver unit 1402 configured to receive, using the local security application session, an operation instruction for the eUICC that is sent by the primary terminal.

Optionally, the processing unit 1401 is further configured to transfer the address information and the security information to the primary terminal, or directly display the address information and the security information in order to indirectly indicate the address information and the security information to the primary terminal, or display a graph including the address information and the security information in order to indirectly indicate the address information and the security information to the primary terminal.

Optionally, the security information is used as a pre-shared key such that the companion terminal and the primary terminal perform mutual authentication using the pre-shared key and establish a local security application session.

Optionally, the transceiver unit 1402 is further configured to receive a local security application session request of the primary terminal, and use obtained key information of a local connection as a pre-shared key, and after the companion terminal and the primary terminal perform mutual authentication using the pre-shared key, if security information sent by the primary terminal is received, complete establishment of the local security application session.

Figure 15:
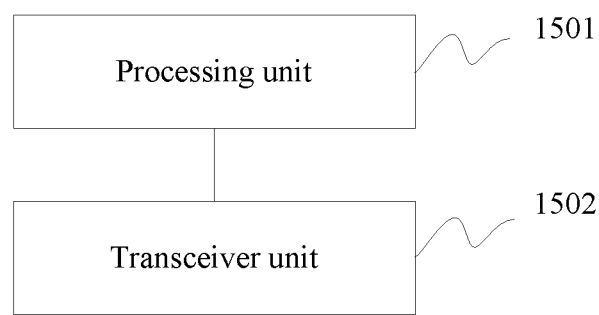
FIG. 15 is a schematic structural diagram of an apparatus for secure interaction between terminals according to an embodiment of the present disclosure.

As shown in FIG. 15, an embodiment of the present disclosure provides a schematic structural diagram of an apparatus for secure interaction between terminals, and the apparatus includes a processing unit 1501 configured to obtain address information and security information that are indicated or indirectly indicated by a companion terminal with an eUICC to a primary terminal, and establish a local security application session according to the address information and the security information, and a transceiver unit 1502 configured to send an operation instruction for the eUICC to the companion terminal using the local security application session.

Optionally, the processing unit 1501 is further configured to receive the address information and the security information that are transferred by the companion terminal, or obtain the address information and the security information using the address information and the security information that are directly displayed by the companion terminal, or obtain the address information and the security information by scanning a graph including the address information and the security information.

Optionally, the security information is used as a pre-shared key such that the primary terminal and the companion terminal perform mutual authentication using the pre-shared key and establish a local security application session.

Optionally, the processing unit 1501 is further configured to send a local security application session request to the companion terminal, and use obtained key information of a local connection as a pre-shared key, and after the primary terminal and the companion terminal perform mutual authentication using the pre-shared key, send the security information to the companion terminal such that the companion terminal completes establishment of the local security application session after determining that the security information sent by the primary terminal is received.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. In addition, the present disclosure may use a form of a computer program product that is implemented on one or more computer-usable storage media (including but not limited to a disk memory and an optical memory) that include computer-usable program code.

The present disclosure is described with reference to the flowcharts and/or block diagrams of the method, the terminal (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing terminal to generate a machine instruction such that the instructions executed by a computer or a processor of any other programmable data processing terminal generate an apparatus for implementing a specific function in one or more processes in the flowcharts and/or in one or more blocks in the block diagrams.

These computer program instructions may also be stored in a computer readable memory that can instruct the computer or any other programmable data processing terminal to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing terminal such that a series of operations and steps are performed on the computer or the other programmable terminal, thereby generating computer-implemented processing. Therefore, the instructions executed on the computer or the other programmable terminal provide steps for implementing a specific function in one or more processes in the flowcharts and/or in one or more blocks in the block diagrams.

Obviously, a person skilled in the art can make various modifications and variations to the present disclosure without departing from the spirit and scope of the present disclosure. The present disclosure is intended to cover these modifications and variations of the present disclosure provided that they fall within the scope of protection defined by the following claims and their equivalent technologies.

The invention claimed is:

1. A method, comprising:
    detecting a hotspot of a primary terminal having a network connection;
    establishing, based on detecting the hotspot, a local connection between the primary terminal and a companion terminal not having the network connection;
    generating secure connectivity information comprising address information of the companion terminal and security information of the companion terminal;
    indicating, to the primary terminal, the secure connectivity information;
    receiving a secure connectivity request from the primary terminal using a first secure session established between the primary terminal and the companion terminal;
    sending a secure connectivity response to the primary terminal after receiving the secure connectivity request;
    establishing a second secure connectivity session between the companion terminal and the primary terminal using the secure connectivity information;
    receiving, through the local connection and using the second secure session between the companion terminal and the primary terminal, an operation instruction for an Embedded Universal Integrated Circuit Card (eUICC) of the companion terminal; and
    deleting a profile from the eUICC of the companion terminal or downloading the profile to the eUICC of the companion terminal.

2. The method of claim 1, wherein indicating the secure connectivity information comprises directly indicating, to the primary terminal, the secure connectivity information.

3. The method of claim 1, wherein indicating the secure connectivity information comprises indirectly indicating, to the primary terminal, the secure connectivity information.

4. The method of claim 1, wherein indicating the secure connectivity information comprises transferring the address information and the security information to the primary terminal to indicate the secure connectivity information to the primary terminal.

5. The method of claim 1, wherein indicating the secure connectivity information comprises displaying the address information and the security information to indicate the secure connectivity information to the primary terminal.

6. The method of claim 1, wherein indicating the secure connectivity information comprises displaying a graph comprising the address information and the security information to indicate the address information and the security information to the primary terminal.

7. The method of claim 1, wherein the security information is configured to be used as a pre-shared key to enable the companion terminal and the primary terminal to perform mutual authentication using the pre-shared key and to establish the second secure session.

8. The method of claim 1, wherein after indicating the secure connectivity information to the primary terminal, the method further comprises:
    receiving a second secure session request of the primary terminal;
    using key information of a local coupling as a pre-shared key; and
    completing establishment of the second secure session after the companion terminal and the primary terminal perform mutual authentication using the pre-shared key and when the security information from the primary terminal is received.

9. A method, comprising:
    providing, by a primary terminal having a network connection, a hotspot;
    establishing, using the hotspot, a local connection between the primary terminal and a companion terminal not having the network connection;
    obtaining secure connectivity information comprising address information of the companion terminal and security information of the companion terminal;
    establishing a first secure session through the local connection between the primary terminal and the companion terminal;
    sending, by a transceiver of the primary terminal, a secure connectivity request to the companion terminal using the first secure session;
    receiving, by the transceiver, a secure connectivity response from the companion terminal after sending the secure connectivity request;
    establishing, by the transceiver, a second secure session between the companion terminal and the primary terminal using the secure connectivity information;
    sending, from the primary terminal to the companion terminal through the local connection, an operation instruction for an Embedded Universal Integrated Circuit Card (eUICC) of the companion terminal using the second secure session between the primary terminal and the companion terminal; and deleting a profile from the eUICC of the companion terminal or downloading the profile to the eUICC of the companion terminal.

10. The method of claim 9, wherein obtaining the secure connectivity information comprises:
receiving the address information and the security information from the companion terminal;
obtaining the address information and the security information from the address information and the security information that are displayed by the companion terminal; or
obtaining the address information and the security information by scanning a graph comprising the address information and the security information.

11. The method of claim 9, wherein the security information is configured to be used as a pre-shared key to enable the primary terminal and the companion terminal to perform mutual authentication using the pre-shared key and to establish the second secure session.

12. The method of claim 9, further comprising:
sending a second secure session request to the companion terminal;
using key information of a local coupling as a pre-shared key; and
sending the security information to the companion terminal after the primary terminal and the companion terminal perform mutual authentication using the pre-shared key.

13. An apparatus, comprising:
an Embedded Universal Integrated Circuit Card (eUICC);
one or more processors coupled to the eUICC and configured to cause the apparatus to:
detect a hotspot of a primary terminal having a network connection;
establish, based on detecting the hotspot, a local connection between the primary terminal and the apparatus not having the network connection;
generate secure connectivity information comprising address information of the apparatus and security information of the apparatus; and
indicate, to the primary terminal, the secure connectivity information; and
a transceiver coupled to the one or more processors and configured to:
receive a secure connectivity request from the primary terminal using a first secure session established between the primary terminal and the apparatus;
send a secure connectivity response to the primary terminal after receiving the secure connectivity request;
establish a second secure session between the apparatus and the primary terminal using the secure connectivity information; and
receive, through the local connection and using the second secure session between the apparatus and the primary terminal, an operation instruction for the eUICC of the apparatus, and
wherein the one or more processors are further configured to cause the apparatus to delete a profile from the eUICC of the apparatus or download the profile to the eUICC of the apparatus.

14. The apparatus of claim 13, wherein the one or more processors are is further configured to cause the apparatus to indicate the secure connectivity information by:
transferring the address information and the security information to the primary terminal;
displaying the address information and the security information to indicate the address information and the security information to the primary terminal; or
displaying a graph comprising the address information and the security information to indicate the address information and the security information to the primary terminal.

15. The apparatus of claim 13, wherein the security information is configured to be used as a pre-shared key to enable the apparatus and the primary terminal to perform mutual authentication using the pre-shared key and to establish the second secure session.

16. The apparatus of claim 13, wherein the transceiver is further configured to:
receive a second secure session request of the primary terminal;
use key information of a local coupling as a pre-shared key; and
complete establishment of the second secure session after the apparatus and the primary terminal perform mutual authentication using the pre-shared key and when the security information from the primary terminal is received.

17. An apparatus, comprising:
one or more processors configured to:
provide, by the apparatus having a network connection, a hotspot;
establish, using the hotspot, a local connection between the apparatus and a companion terminal not having the network connection;
obtain secure connectivity information comprising address information of the companion terminal and security information of the companion terminal; and
establish a first secure session through the local connection between the apparatus and the companion terminal; and
a transceiver coupled to the one or more processors and configured to:
send a secure connectivity request to the companion terminal using the first secure session;
receive a secure connectivity response from the companion terminal after sending the secure connectivity request;
establish a second secure session between the companion terminal and the apparatus using the secure connectivity information; and
send, to the companion terminal through the local connection, an operation instruction for an Embedded Universal Integrated Circuit Card (eUICC) of the companion terminal using the second secure session between the apparatus and the companion terminal, and
wherein the one or more processors are further configured to delete a profile from the eUICC of the companion terminal or download the profile to the eUICC of the companion terminal.

18. The apparatus of claim 17, wherein the one or more processors are is further configured to obtain the secure connectivity information by:
receiving the address information and the security information from the companion terminal;
obtaining the address information and the security information using the address information and the security information that are displayed by the companion terminal; or obtaining the address information and the security information by scanning a graph comprising the address information and the security information.

19. The apparatus of claim 17, wherein the security information is configured to be used as a pre-shared key to enable the apparatus and the companion terminal to perform mutual authentication using the pre-shared key and to establish the second secure session.

20. The apparatus of claim 17, wherein the one or more processors are is further configured to:
  send a second secure session request to the companion terminal;
  use key information of a local coupling as a pre-shared key; and
  send the security information to the companion terminal after the apparatus and the companion terminal perform mutual authentication using the pre-shared key.

21. The method of claim 1, wherein the hotspot comprises a WI-FI network sharing hotspot, wherein the method further comprises sending a WI-FI key to the primary terminal, and wherein establishing the local connection comprises establishing a WI-FI local connection between the primary terminal and the companion terminal.

22. The method of claim 1, wherein the hotspot comprises a BLUETOOTH network sharing hotspot, wherein the method further comprises sending a personal identification number (PIN) to the primary terminal, and wherein establishing the local connection comprises establishing a BLUETOOTH local connection between the primary terminal and the companion terminal.

* * * * *

UNITED STATES PATENT AND TRADEMARK OFFICE
CERTIFICATE OF CORRECTION

PATENT NO. : 12,137,094 B2
APPLICATION NO. : 17/341961
DATED : November 5, 2024
INVENTOR(S) : Ziyao Cheng and Shuiping Long Page 1 of 1

It is certified that error appears in the above-identified patent and that said Letters Patent is hereby corrected as shown below:

In the Claims

Claim 1, Column 29, Line 60: "second secure connectivity session" should read "second secure session"

Claim 18, Column 32, Line 60: "processors are is further" should read "processors are further"

Signed and Sealed this
Third Day of December, 2024

Katherine Kelly Vidal
*Director of the United States Patent and Trademark Office*